Figure 1:
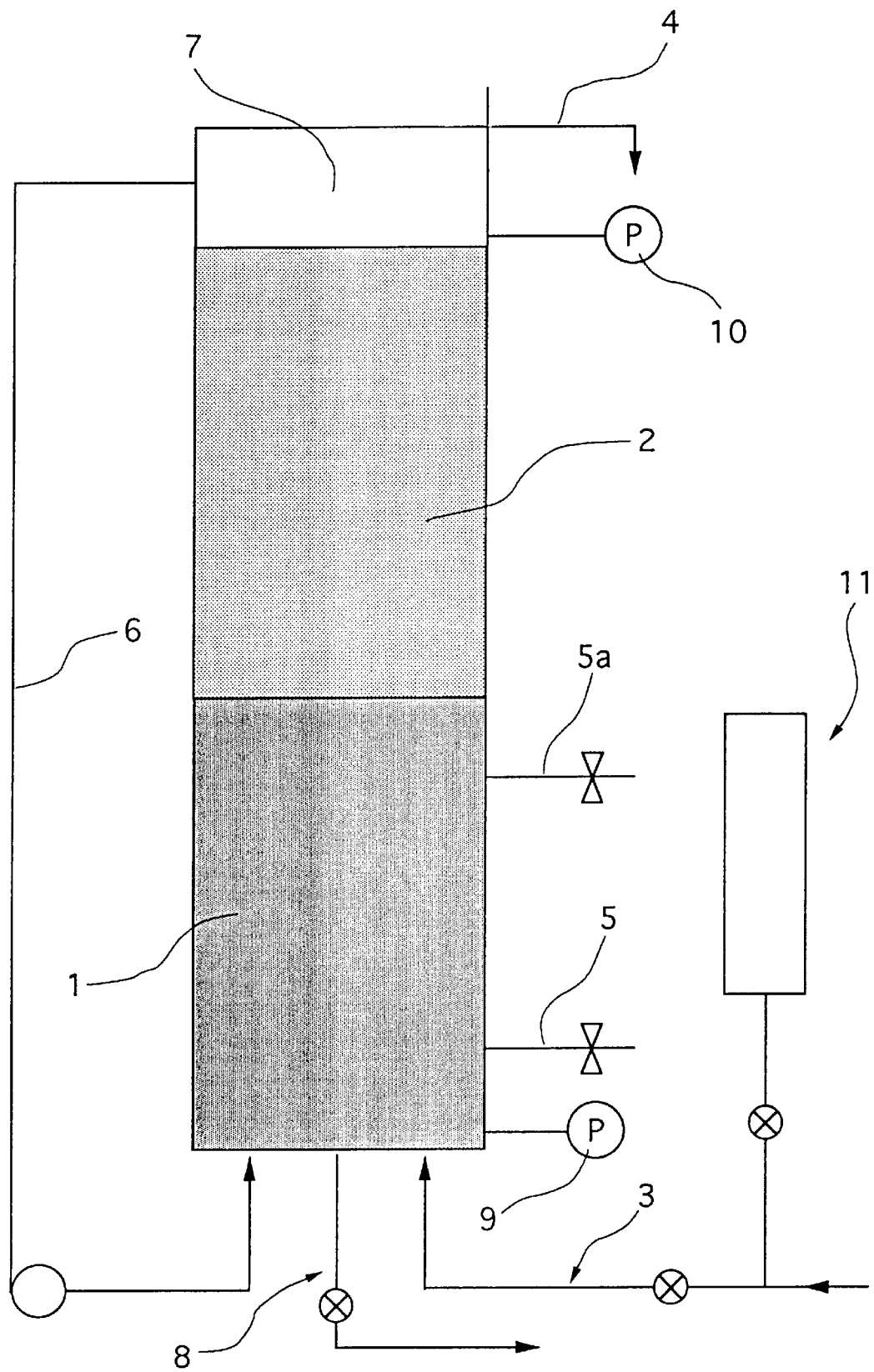

United States Patent
Payraudeau

[19]

[11] Patent Number: 6,083,396
[45] Date of Patent: Jul. 4, 2000

[54] METHOD FOR CHECKING AND REGULATING THE PRESSURE LOSS IN A BIOLOGICAL FILTER AND INSTALLATION FOR EMBODIMENT OF SUCH A METHOD

[75] Inventor: Michele Payraudeau, Eaubonne, France

[73] Assignee: Omnium de Traitement et de Valorisation, Cedex, France

[21] Appl. No.: 09/098,057

[22] Filed: Jun. 16, 1998

[30] Foreign Application Priority Data

Jun. 19, 1997 [FR] France .................................. 97 07884

[51] Int. Cl.⁷ ...................................................... C02F 3/06
[52] U.S. Cl. ........................... 210/614; 210/617; 210/631; 210/709; 210/137; 210/150; 210/209
[58] Field of Search ..................... 210/614, 616, 210/617, 618, 631, 709, 702, 150, 151, 137, 111, 209

[56] References Cited

U.S. PATENT DOCUMENTS

| | | | |
|---|---|---|---|
| 4,551,250 | 11/1985 | Morper et al. | 210/617 |
| 4,931,183 | 6/1990 | Klein et al. | 210/614 |
| 4,954,259 | 9/1990 | Elmaleh et al. | 210/617 |
| 4,956,093 | 9/1990 | Pirbazari et al. | 210/631 |
| 5,582,733 | 12/1996 | Desbos et al. | 210/617 |

FOREIGN PATENT DOCUMENTS

| | | |
|---|---|---|
| 0019055A1 | 11/1980 | European Pat. Off. . |
| 0076898A1 | 4/1983 | European Pat. Off. . |
| 0265303A1 | 4/1988 | European Pat. Off. . |

OTHER PUBLICATIONS

M. Kaiser: "Anwendung der kombinierten Floxkung bei der Fest/Flüssig–Trennung in der Steinkohlenaufbereitung" Aufbereitungs–Technik, vol. 34, No. 1, janvier 1993, Wiesbaden, DE.

*Primary Examiner*—Christopher Upton
*Attorney, Agent, or Firm*—Coats & Bennett, P.L.L.C.

[57] ABSTRACT

The invention relates to a method for checking and regulating the pressure loss in a biological filter of the type comprising an immersed filter bed (2) consisting of at least one layer of granular filtration material, the said granular material layer acting as a support for a biomass used to degrade carbon-based and/or nitrogen-based pollution in water to be filtered, characterized in that it comprises a step consisting of continuously or discontinuously injecting at least one coagulating agent (1) into the said water before its entry into the said filter.

11 Claims, 3 Drawing Sheets

METHOD FOR CHECKING AND REGULATING THE PRESSURE LOSS IN A BIOLOGICAL FILTER AND INSTALLATION FOR EMBODIMENT OF SUCH A METHOD

This invention relates to the water treatment domain.

More precisely, the invention relates to a method used to check and regulate the pressure loss in a biological filter of the type comprising a filter bed consisting of at least one layer of granular filtration material, the said layer of granular material being used as a support for a biomass used to degrade carbon-based and/or nitrogen-based pollution of the water to be filtered.

Applications of the invention are mainly in the field of biological purification of waste water, but it may also be used in biological filters used for making water drinkable. Biofilters are conventionally used for the treatment of waste water for purification, but also have applications in the treatment of water for making it drinkable.

This type of filter bed is composed of one or several layers of granular material that may be denser than water, for example sand or gravel, or may be less dense than water, for example such as expanded polystyrene. The size grading of these materials may be variable depending on the required degree of filtration. Water treated in this type of device may flow upwards or downwards, depending on the filter configuration. For example, one immersed bed filtration device known in standard practice is a filter described in European patent EP - 265303 deposited by the Applicant, in which the filter bed is composed of several layers of granular materials.

This type of biological filter has many advantages, including the possibility of treating different types of pollution (carbon-based and/or nitrogen-based) within a small treatment volume, and their high treatment capacity.

Due to their basic filtration function which implies retention of materials in suspension and increase of the biomass contained in them, the pressure loss observed during filtration cycles gradually increases. This is why these bio-filters are provided with means of periodically washing the granular material in order to remove impurities that have collected in them. This type of washing is usually done using filtered water or untreated water, or a mixture of air and water, and are used after stopping operation of the filter in filtration mode during the washing cycles. Washing with water is possible by distribution of clean water using the distribution means provided for the water to be treated, or by distribution of filtered water in the opposite direction to the treatment current (backwash). When a backwash is used, the water distribution device in filtration mode may be used to collect the backwash water. Washing is usually done at regular intervals, for example every 24 hours, in order to ensure that the filter works correctly. Their duration depends on the washing technique used and the severity of clogging. In general, this washing will be done for a time that varies between 5 minutes and 60 minutes. Excellent biological filtration results can be achieved using this type of filter, due to the alternation of these filtration and washing cycles.

Furthermore, when the bio-filter has to be used beyond the nominal capacity for which it was designed, in other words when the quantity of pollution in the water to be treated increases significantly, or when the flow of water to be treated increases suddenly, the performances of this filter can be maintained by increasing the frequency of the washing cycles. However, this solution has the disadvantage that it more frequently interrupts operation of the filter. Therefore, there are several solutions known in standard practice for maintaining the frequencies of washing cycles close to the normal even when the filter is used beyond its nominal capacity.

One of these solutions consists of carrying out short washing periods ("mini-washes") between two consecutive washing cycles, for example in the form of water flushes. This type of solution is used particularly in filters operating with rising flows in which a space is provided above the filter bed, this space being used to build up a reserve of filtered water that can be used for the washing cycles, and also for short water flushes between washing cycles. This solution is attractive, but it is not always very efficient and has the disadvantage that it implies short filter interruption times which in some cases could result in a minor disturbance to its operation.

Another solution consists of carrying out a sequenced aeration of the filter material. It has been observed that this type of aeration, described in detail in French patent FR2565962 submitted by the Applicant, is capable of giving a better distribution of materials in suspension within the granular bed, which can increase the duration of filtration cycles and reduce the water quantities necessary to perform washing cycles. However, this type of solution has the disadvantage that it can only be used for bio-filters for which the filtration material acts as a support for the aerobic biomass intended to degrade carbon-based pollution in the effluent or nitrify the ammonia pollution of this water. However, obviously it cannot be used to clean filters in which the granular material is used to support a biomass that has to be used in anaerobiosis to denitrify the effluent being treated.

The purpose of this invention is to propose a method for checking and regulating the pressure loss in a biological filter when it is used beyond the nominal capacity for which it was designed.

In particular, one objective of the invention is to describe a method of this type that in this case could increase the duration of filtration cycles, in other words the time between two consecutive washing cycles.

Yet another objective of the invention is to divulge a method of this type that, if the quantity of pollution in the water flow to be treated increases, will make it possible to maintain the duration of filtration cycles without reducing the filtering performances of the filter.

Yet another objective of this invention is to propose a method of this type that, for a given degree of clogging, can reduce the quantities of washing water that need to be used during washing cycles.

Yet another objective of this invention is to propose a method of this type that can be used without interrupting filtration.

These various objectives are achieved by the invention which relates to a method for checking and regulating the pressure loss in a biological filter of the type including an immersed filter bed composed of at least one layer of granular filtration material, the said layer of granular material acting as a support for a biomass used to degrade carbon-based and/or nitrogen-based pollution in water to be filtered, the said method being characterized in that it comprises a step consisting of continuously or discontinuously injecting a coagulating agent into the said water before its entry into the said filter.

Thus, the invention proposes an unexpected solution to the problem of gradual clogging of biological filters, which consists of injecting at least one coagulating agent into the water to be filtered, during the filtration.

Note that coagulating agents are used in standard practice in the field of water treatment, for flocculation treatments designed to eliminate colloidal particles contained in the water. Flocculation is a physicochemical action, the purpose of which is to modify the state of particles contained in water, and mainly colloidal particles with a negative electrical charge at the surface. In water, these particles tend to exert a repulsive electrical action. They can be eliminated by decantation by neutralizing their electric charge by adding a coagulating agent consisting of a positively ionized compound. In conventional methods, this coagulating agent may consist of a polymer containing a filler, or a metallic salt. The most frequently used metallic salts are ferric chloride, ferric sulfate, ferrous sulfate, aluminum sulfate, and aluminum polymers such as aluminum polychloride (WAC). The use of this type of coagulating agent results in the formation of flocculates that may subsequently be eliminated by decantation.

Considering the known use of coagulating agents for the purposes of the flocculation method that results in an aggregation of colloidal particles, an expert in the field would logically have concluded that the use of this type of compound in a bio-filter would tend to clog it faster. However, this invention demonstrates that on the contrary, the introduction of a coagulating agent into the water to be filtered immediately before it is treated in the biofilter has the opposite effect, which consists of delaying this clogging and thus reducing the pressure loss observed in the biofilter. Furthermore, it will be noted that the Applicant has not identified the mode of action of the coagulating agents in the declogging method with certainty.

In order to observe the result achieved by the purpose of this invention, namely a reduction in the pressure loss within a biofilter when the biofilter is used beyond its nominal capacity, the coagulating agent (or possibly coagulating agents) may be injected empirically, for example at regular time intervals between two washing cycles of the filtered material. However, according to one preferred variant embodiment of the method according to the invention, it includes a step that consists of monitoring the pressure loss in the said filter, the coagulating agent then being injected when the value of the pressure loss in the said filter reaches a value greater than the predetermined reference.

The time during which the coagulating agent is injected may also be determined more or less empirically. However, also preferentially, the method includes a step consisting of injecting at least one coagulating agent for sufficient time to enable the pressure loss to drop to a value below a predetermined reference value. This lower value may beneficially be defined by the value of the initial pressure loss observed at the end of the last washing cycle used.

With this type of preferred variant, a range of values of the pressure loss may be defined bounded by an upper value at which the coagulating agent may be injected, and by a lower value at which the injection concerned may be stopped, and the injection of the coagulating agent may be made dependent on when the value of the observed pressure loss enters into this range.

In this respect, note also that the coagulating agent may be injected automatically by using automatic means of measuring the pressure loss observed at the filter outlet.

Concerning the coagulating reagent that could be used within this invention, it will preferably be a metal salt, although other types of coagulating agents could have the same effect.

Beneficially, this metallic salt is chosen from the group consisting of ferric chloride, ferric sulfate, ferrous sulfate, aluminum sulfate, and aluminum polymers (such as "WAC" (tradename)).

Preferably, the said coagulating agent is injected at a content of 5 to 50 mg/l into the water to be filtered, and preferably between 10 to 20 mg/l.

The invention also relates to a biological filter for water treatment specially designed for implementation of the method described above, including an immersed filter bed composed of at least one layer of granular filtration material seeded by a biomass, means of conveying the water to be treated into the filter and means of draining the filtered water, characterized in that it includes methods of measuring the pressure loss at the exit from the said immersed filter bed, and means of carrying at least one coagulating agent in the water to be filtered before its entry into the said immersed filter bed.

Preferably, the said filter comprises automatic means of opening and closing the said conveyance means when the observed pressure loss is within a predetermined range of values.

Figure 2:
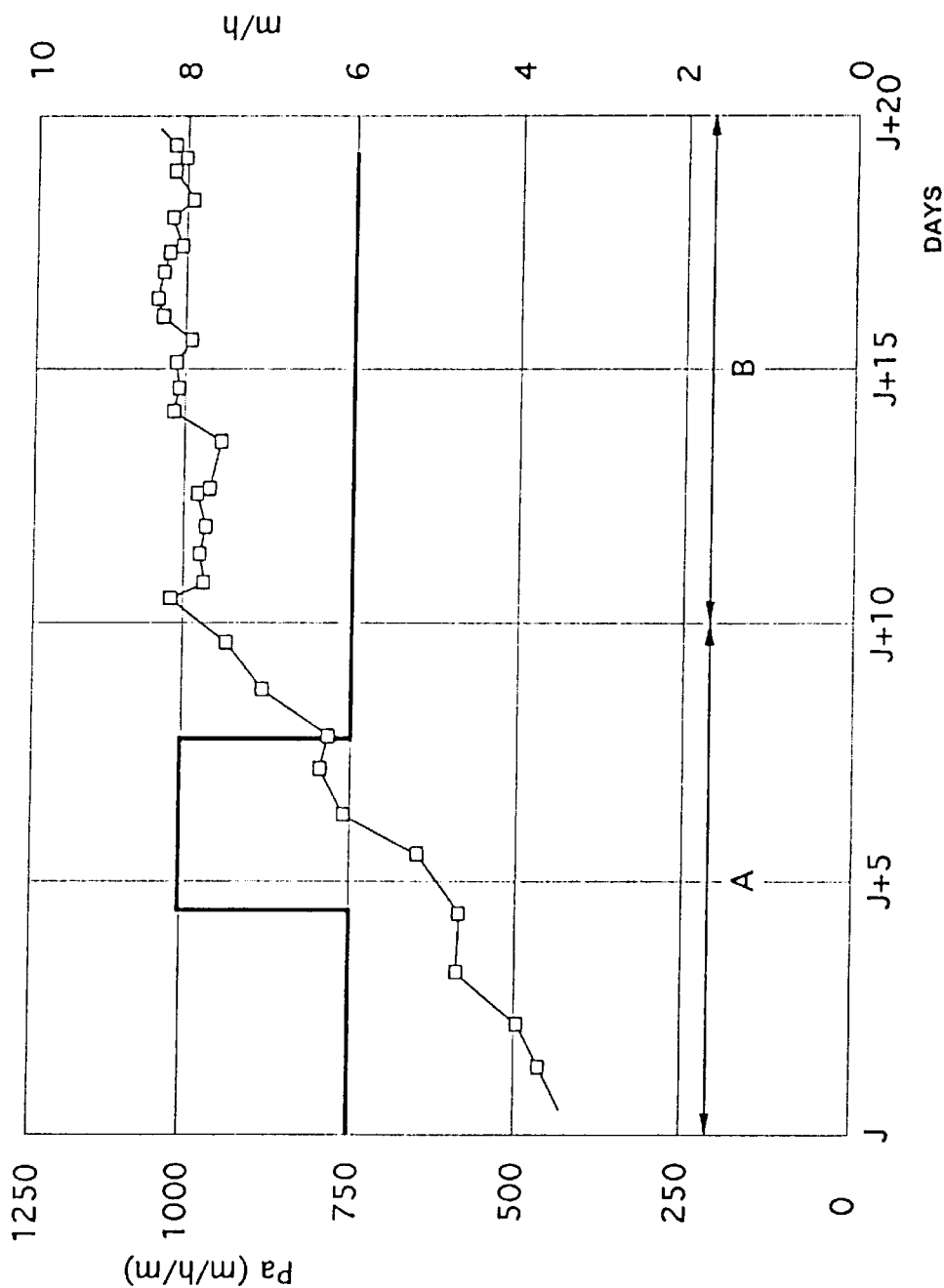
Figure 3:
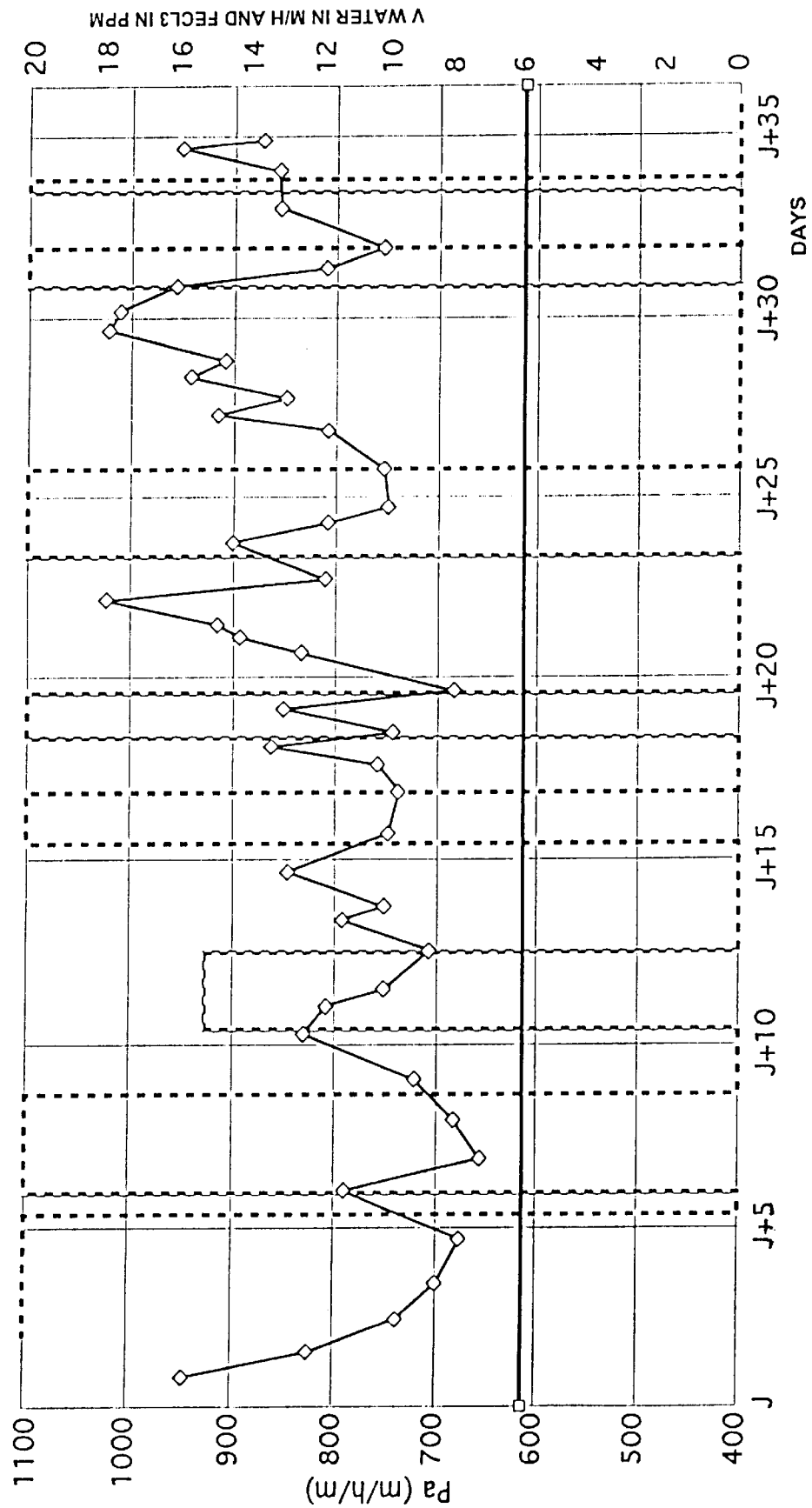

The invention, and its various advantages, will be more easily understood by reading the following description of a non-restrictive embodiment of it, with reference to the drawings in which:

FIG. 1 is a schematic view of a biological filter for embodiment of the method according to the invention;

FIG. 2 contains a graph showing the variation of the pressure loss in the biofilter shown in FIG. 1 as a function of time and at constant water flow, if no coagulating agent is injected as recommended by the invention;

FIG. 3 contains a graph showing the variation of the pressure loss in the biofilter shown in FIG. 1 as a function of time and at constant water flow, if a coagulating agent is injected as recommended by the invention.

The biological filter shown in FIG. 1 includes a reaction vessel 1 provided with a granular material bed 2 that acts as support for a biomass, water conveyance means 3 for the water to be treated leading into the lower part of the reaction vessel, and means of evacuating 4 the treated water after it has passed through the granular material bed 2 provided in the upper part of the reaction vessel. The filter is fitted with a lower aeration manifold 5 and an intermediate aeration manifold 5a provided so that if necessary, an upper aerated filtration area and a lower anoxic filtration area may be defined. A filtered water recirculation loop 6 is also provided, as in a conventional installation. In the upper part of the reaction vessel there is an area 7 provided above the filter material that is used to build up a treated water reserve, and which is also provided with purge means 8 in the lower part of the filter.

The reaction vessel according to this invention is provided with means of measuring the pressure loss comprising:

a first sensor 9 provided in the lower part of the filter used to measure the pressure Pe in the water as it enters the filter bed, a second sensor 10 provided in the upper part of the filter used to measure the water pressure Ps as it exits from the filter material and therefore to deduce the total pressure loss in the material (Pe - Ps).

Also in accordance with the invention, the filter is equipped with means 11 of distributing a coagulating agent in the water to be treated. In this embodiment, this coagulating agent consists of ferric chloride in liquid form.

In this embodiment, the described filter was used for tertiary nitrification of an effluent. Obviously, the method according to the invention in no way depends on the configuration of the filter, and may obviously be used in a nitrification—denitrification configuration, or for reduction of carbon-based pollution or for denitrification alone.

This filter works as follows in filtration mode. Water to be treated passes through conveyance means 3 and enters the reaction vessel, and is filtered as it passes through the granular material bed before being discharged through evacuation means 4. If the filter is configured to treat nitrogen-based pollution in water, the aeration manifold is used and part of the treated water is recirculated in the anoxic area through the recirculation loop 6. Ferric chloride may be distributed in treated water, according to this invention.

When the impurities in the filter bed have to be removed, filtration is interrupted and a washing cycle is started. The water inlet carrying water to be treated is then closed, and purge means 8 are controlled so that the filtered water collected in the upper area 7 of the reaction vessel, possibly together with added air alternately, flows downwards. The reaction vessel can then once again be used in filtration mode.

FIG. 2 shows a comparative example in which the biological filter shown in FIG. 1 was used according to prior art without injection of a coagulating agent between washing cycles. The water speed was kept constant and equal to 6 m/h (except for a short period of 3 days during which the speed was increased to 8 m/h) and an approximately constant quality of water was used.

The total pressure loss observed during filtration was measured at the exit from the filter bed by measuring the differences in pressures recorded by sensors 9 and 10. Washing cycles are shown on the graph by white squares.

During the first ten days in which the biofilter was in service (period A), the filter bed was washed regularly every 24 hours except during the eighth day during which two washings were done during the day. During this period A, a practically linear increase in the pressure loss was observed corresponding to an increase in the dirt accumulation in the filter. In practice, the total pressure loss during this period increased from about 400 to about 1000 Pa/(m/h)/m of material.

Starting from the 11th day and until the 30th day (period B), the frequency of washing cycles had to be increased to two washings, or even three washings, per day. This increase in the frequency kept the total pressure loss to about 1000 Pa/(m/h)/m but could not significantly reduce this value.

The filter according to this invention was then tested by injecting ferric chloride at a dose of 20 mg/l. Different injection periods varying from 1 day to 5 days were used. In practice, this injection was done using coagulating agents injection means 11 provided in the filter according to the invention.

The water speed passing through the filter during the test period was kept at a constant value of 6 m/h, similar to the speed used in the reference example mentioned above. The quality of the water to be filtered was approximately constant and approximately the same as the quality of water treated during the comparative period described above.

FIG. 3 shows injections of coagulating agent marked on the graph as a dashed line. Different injection durations were tested, varying from one day to 5 days. As can be seen clearly on the figures, these injections significantly reduce the total pressure loss while maintaining the washing frequency at one washing per day, or exceptionally two washings per day. In practice, these injections reduced the total pressure loss to a value of about 800 Pa/(m/h)/m, while keeping the washing cycle frequency low.

Therefore, the invention can significantly reduce the cost of using biological filters by reducing the frequency of washing cycles necessary to maintain filter performances, particularly if the filter is used beyond its nominal capacity.

The embodiment of the invention described herein is not intended to reduce the scope of the invention. Therefore, many modifications could be made to it without going outside the scope of the invention. In particular, note that an agent other than ferric chloride could be used, and the method according to the invention could be used on any biofilter including at least one granular filtration bed in which the collected impurities have to be eliminated.

What is claimed is:

1. Method for checking and regulating the pressure loss in a biological filter comprising an immersed filter bed including at least one layer of granular filtration material, said granular material layer acting as a support for a biomass used to degrade carbon-based and/or nitrogen-based pollution in water to be filtered, comprising
   continuously or discontinuously injecting at least one coagulating agent into the said water before its entry into the said filter; and
   monitoring the pressure loss of said filter and injecting said coagulating agent when the value of the pressure loss of said filter reaches a value exceeding a predetermined upper reference value.

2. The method according to claim 1, wherein injecting at least one coagulating agent takes place for a sufficient time to allow the pressure loss to reach a predetermined lower reference value.

3. The method according to claim 2, wherein the lower reference value is the value of the initial pressure loss observed after the last washing cycle used.

4. The method according to claim 2, further comprising automatically injecting the coagulating agent when the pressure loss observed at the filter outlet is between the predetermined upper reference value and the predetermined lower reference value.

5. The method according to claim 1, wherein the coagulating agent is a metallic salt.

6. The method according to claim 5, wherein the metallic salt is chosen from the group composed of ferric chloride, ferric sulfate, ferrous sulfate, aluminum sulfate, and aluminum polymers.

7. The method according to claim 1, wherein the coagulating agent is injected at a rate of 5 to 50 mg/l.

8. The method according to claim 7, wherein the coagulating agent is injected at a rate of 10 to 20 mg/l.

9. A method of regulatiing the pressure loss in a biological filter comprising an immersed filter bed having at least one layer of granular filtration material, where the granular material layer acts as a support for a biomass used to degrade carbon-based and/or nitrogen-based pollution in water to be filtered, including: directing an influent into and through the biological filter; and monitoring the pressure loss across the biological filter and in response to the pressure loss exceeding a selected value reducing the pressure loss across the biological filter by mixing at least one coagulating agent with the influent prior to reaching the biological filter bed.

10. The method of claim 9 wherein the influent is waste water.

11. A system for water treatment, including:
   a) a biological filter comprising an immersed filter bed having at least one layer of granular filtration material, where the granular material layer acts as a support for a biomass used to degrade carbon-based and/or nitrogen-based pollution in water to be filtered;
   b) an influent inlet for introducing water to be filtered into the biological filter;
   c) a pressure sensor for sensing a pressure drop across the biological filter; and
   d) a coagulant inlet for directing a coagulating agent into the influent prior to the influent's introduction into the biological filter in response to the pressure drop across the biological filter exceeding a predetermined threshold.

* * * * *